(12) United States Patent
Ishiguro (10) Patent No.: US 6,869,238 B2
(45) Date of Patent: Mar. 22, 2005

(54) PRINTING CONTROL PROGRAM, PRINTING CONTROL SYSTEM, AND PRINTING CONTROL METHOD

(75) Inventor: Keiji Ishiguro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/717,507

(22) Filed: Nov. 21, 2003

(65) Prior Publication Data

US 2004/0145755 A1 Jul. 29, 2004

(30) Foreign Application Priority Data

Nov. 26, 2002 (JP) ........................................ 2002-341941

(51) Int. Cl.[7] ................................................ B41J 11/44
(52) U.S. Cl. ........................... 400/76; 400/70; 358/1.15
(58) Field of Search ............................. 400/61, 62, 70, 400/76; 358/1.15–1.18, 1.9

(56) References Cited

U.S. PATENT DOCUMENTS 4,826,333 A * 5/1989 Tanaka ........................ 400/76

6,331,894 B1 * 12/2001 Shimizu ..................... 358/1.13
6,611,347 B1 * 8/2003 Okada et al. ............... 358/1.15

FOREIGN PATENT DOCUMENTS

| JP | A 2001-130078 | 5/2001 | |
| JP | 2002103725 A * | 4/2002 | ............ B41J/21/00 |

* cited by examiner

Primary Examiner—Minh Chau
(74) Attorney, Agent, or Firm—Oliff & Berridge, PLC (57) ABSTRACT

Based on both logical information and layout information capable of discriminating a fixed portion of print data from a variable portion of the print data in a process operation of a first page of a printing matter, a printing control system separates the variable portion of the print data from the fixed portion of the print data, and preliminarily registers the print data of the fixed portion into a storage apparatus provided on a printing apparatus. While a process operation for a second page of the printing matter and a process operation for a fixed portion having the same format, to which a printing process operation has been once carried out, are not repeatedly carried out, since only the variable portion of the print data is transmitted to the printing apparatus, both data transfer time for the printing apparatus and printing process time can be shortened.

6 Claims, 11 Drawing Sheets

ABC, BCD, EFG, •••••••••, EOF

CHARACTER CODE

SEGMENTING CODE

FIG. 5

| ITEM SORT | ITEM ATTRIBUTE | ACQUISITION CSV | AUXILIARY INFORMATION |
|---|---|---|---|
| CHARACTER | VARIABLE | 1 | POSITION (x, y)<br>FONT<br>SIZE<br>CHARACTER ATTRIBUTE<br>(MODIFICATION) |
| NUMERAL VALUE | VARIABLE | 1 | POSITION (x, y)<br>FONT<br>SIZE<br>NUMERAL VALUE ATTRIBUTE<br>(MODIFICATION, NOTATION FORMAT) |
| FIGURE | FIXED | 0 | POSITION (x, y)<br>FIGURE TYPE<br>(LINE, CIRCLE ETC.)<br>FIGURE ATTRIBUTE |
| IMAGE | FIXED | 0 | POSITION (x, y)<br>IMAGE FILE<br>IMAGE ATTRIBUTE |
| ⋮ | ⋮ | ⋮ | ⋮ |

PRINTING CONTROL PROGRAM, PRINTING CONTROL SYSTEM, AND PRINTING CONTROL METHOD

BACKGROUND OF THE INVENTION

1. Field of the Invention

The present invention is related to a printing control program, a printing control system, and a printing control method.

2. Description of the Related Art

In a printing system used in corporate offices, a number of documents are output by various kinds of application programs using various templates. In such a printing system, the various templates are provided for various services in each of departments regarding salary, accounting, credit depositing, and personnel affairs.

Generally, the above-described printing system is structured in such a manner that a printer and a plurality of processing apparatus for executing the various kinds of application programs are connected each other by an interface such as a computer network.

In a printing system that uses templates, printing is accomplished by using a plurality of templates in an office automation system such as a word processor. In the printing, it is required to print a large volume of documents in a significantly high speed in order to guarantee a completion of the required printing by every monthly or weekly due term.

Conventionally, an overlay printing method is known as a method for printing a high volume of documents in a high speed (see JP-A-2001-130078, specifically FIG. 1 thereof). In the overlay printing method, print data is firstly transmitted from a processing system in which a print request is issued to a printing apparatus. Then, the printing apparatus carries out a command analysis and a drawing process operation of the print data, and then, processed results are converted into raster (bit map) data which can be handled by a printing mechanism unit.

In a printing process operation after the raster converting operation, such a data which is transmitted to the printing apparatus is preliminarily subdivided into a fixed portion thereof and a variable portion thereof, and then the fixed portion is registered as overlay information on the side of the printing apparatus in the processing system in which the print request is issued.

In the case that the above-described overlay printing method is employed, the overlay information which has been previously transmitted/registered to the printing apparatus is converted into such a raster data which may be readily processed in the printing apparatus, and thereafter, the raster data is stored in the storage apparatus in which provided for an overlay printing. While only the print data of the variable portion is transmitted from the processing system to the printing apparatus, both the analyzing process operation and the drawing process operation are carried out in the printing apparatus, and the processed print data is overlaid with respect to the overlay information. As a result, the processing time required for the overlay information is reduced.

Overlay information includes table, frames and fixed character strings when stylized printing operation is carried out. In the normal stylized printing operation, since several sorts of overlays are employed, a large number of pages can be printed. Since several sorts of formats are employed in printing operation for business systems overlay printing systems are generally employed.

Figure 10:
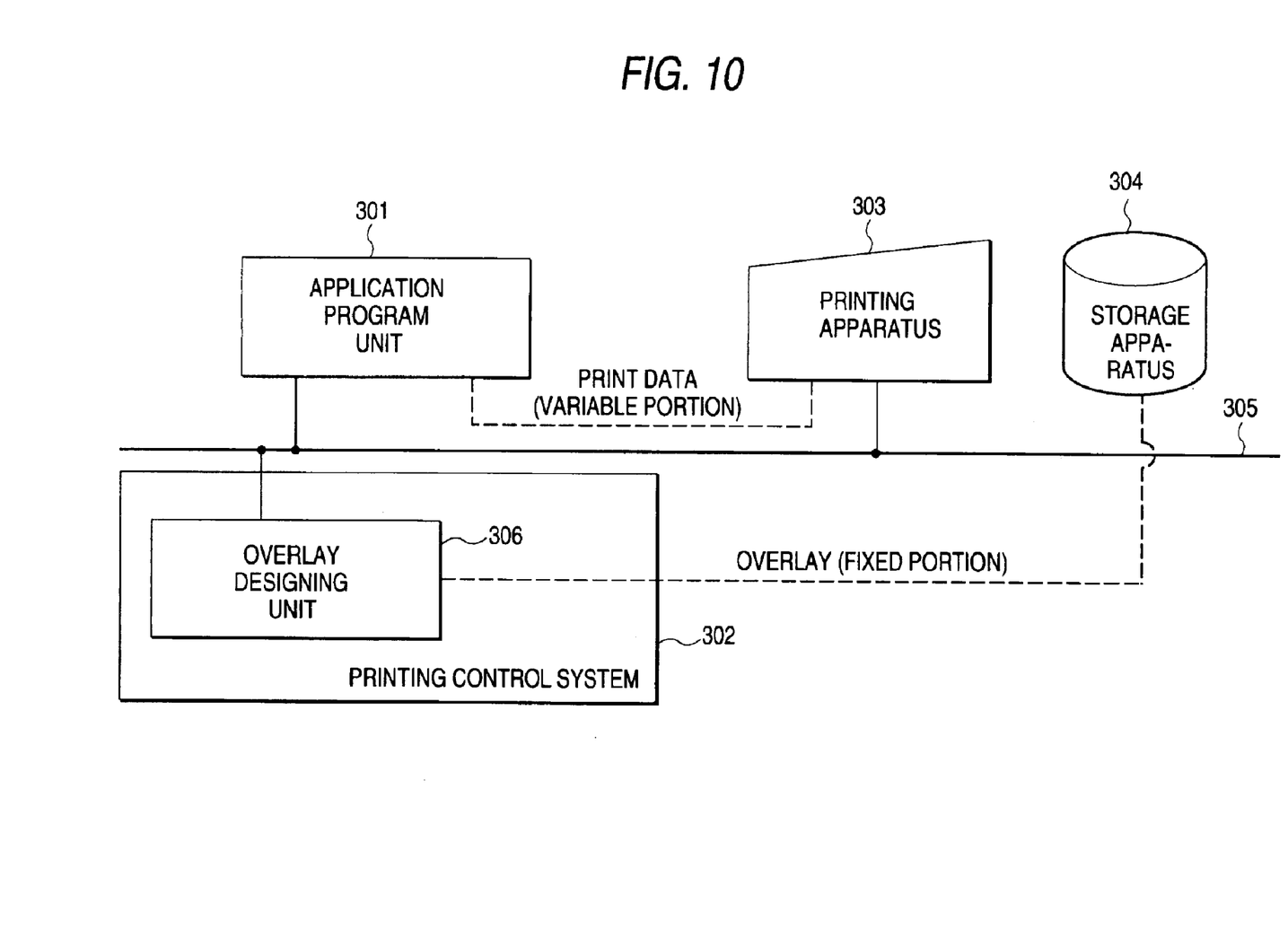
FIG. 10 is a block diagram for indicating the arrangement of the printing system of the prior art.
Figure 11:
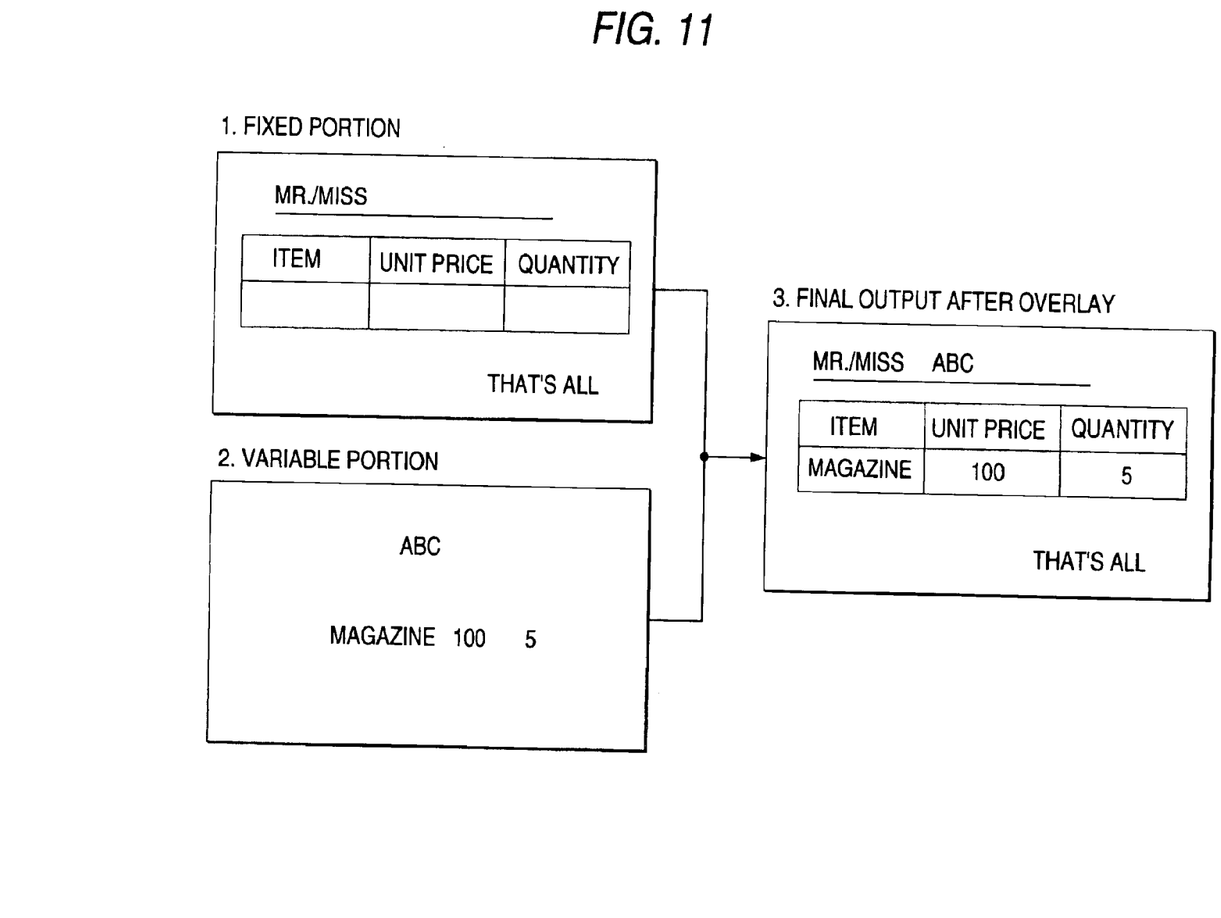
FIG. 11 is a diagram for explaining the general-purpose overlay printing operation.
Figure 12:
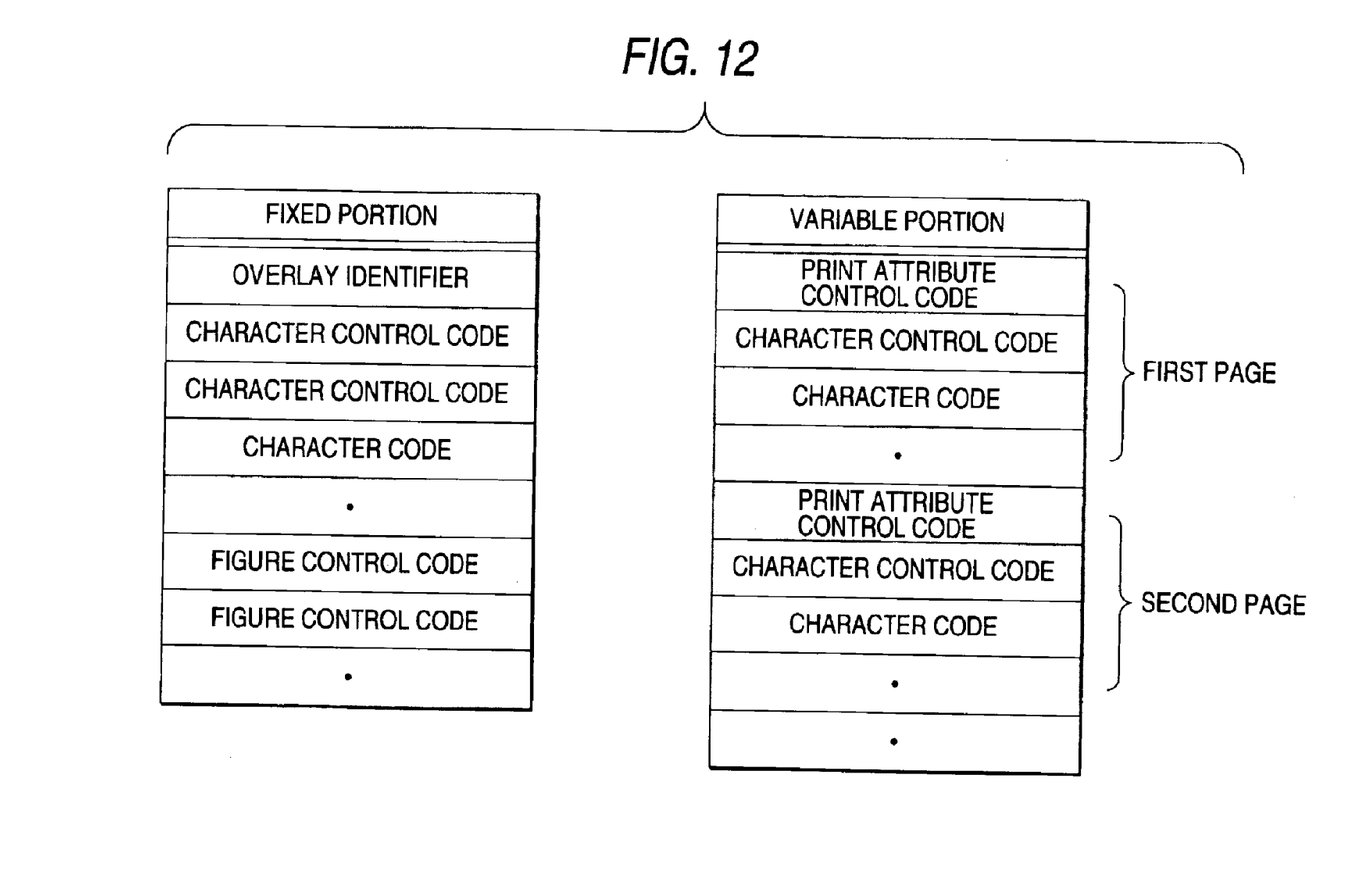
FIG. 12 is a diagram for explaining the data used in the overlay printing operation in the prior art.

Hereinafter, the above-explained conventional techniques will be described in detail with reference to FIGS. 10 through 12. FIG. 10 is a block diagram showing an arrangement of a conventional printing system. FIG. 11 is a diagram for explaining the general overlay printing operation. FIG. 12 is a diagram for explaining conventional data used in the overlay printing operation.

As shown in FIG. 10, the conventional printing system includes: an application program unit 301 such as a personal computer; a printing control system 302; a printing apparatus 303; a storage apparatus 304; and a communication line 305 which connects the respective apparatus to each other. The printing control system 302 has an overlay designing unit 306. The application program unit 301 produces print data corresponding to a variable portion to be printed, and the overlay designing unit 306 designs an overlay corresponding to a fixed portion to be printed so as to acquire overlay information.

The storage apparatus 304 registers the overlay information (fixed portion) designed in the overlay designing unit 306 via the printing apparatus 303. As a result, the overlay information from the storage apparatus 304 becomes ready to be accessed by the printing apparatus 303. When a printing operation is carried out, the printing apparatus 303 receives the print data of the variable portion from the application program unit 301, and also, reads out the overlay information stored in the storage apparatus 304 as the print data of the fixed portion, and then overlays the print data of the variable portion over the print data of the fixed portion, and thereafter, performs a printing process operation with respect to this overlaid result.

With reference to FIG. 11, a structure of overlay information is explained. As shown in FIG. 11, a fixed portion corresponds to overlay information in which while an input item is previously designed by layout information such as a ruled line, variable information may be entered into this input item. In the case of the fixed portion, although not shown, information used to form the fixed portion is sent from another apparatus to the overlay designing unit 306, and then, designing of the overlay information is carried out in this overlay designing unit 306.

A variable portion, as shown in FIG. 11, corresponds to variable print data which is used to be entered into the input item determined by the fixing portion in an overlay manner. In the case of the variable portion, since the print data functioning as the variable portion is prepared in the application program 301, this print data may be produced as the print data of the variable portion.

When both the print data of the variable portion supplied from the application program portion 301 and the print data of the fixed portion supplied from the storage apparatus 304 are collected in the printing apparatus 303, as indicated in FIG. 11, the variable portion is overlaid on the fixed portion, and then, a printing process operation is carried while this overlaid result is employed as a final output. Since the print data of the fixed portion has been previously registered in the storage apparatus 304 provided on the printing apparatus 303 and is expanded, the processing performance of the printing apparatus 303 can be improved.

In this case, a description is made of data utilized in an overlay printing operation with reference to FIG. 12. As shown in FIG. 12, a fixed portion includes: an overlay identifier; a character control code; a character code; and a figure control code. The overlay identifier corresponds to such an identifier for identifying an overlay. The character control code corresponds to such a code for controlling a font, a size, and modification information. The character code corresponds to a code of a character string to be printed. The figure control code corresponds to such a code for controlling a vector figure and an image.

As indicated in FIG. 12, a variable portion includes: a print attribute control code; a character control code; and a character code. The print attribute control code corresponds to such attribute information as a size of a printing paper, a printing direction, a printing surface, and a use overlay. Both the character control code and the character code are similar to those as explained in the above-described fixed portion.

The print data is subdivided into the variable portion and the fixed portion, each having the format information as shown in FIG. 12. As a consequence, in the case that a format is changed in connection with a change in business contents, there are some possibilities that the variable portion containing the format information must be changed. Normally, the variable portion is produced by the application program unit 301 which is operated in the process operation. As a consequence, there are some possibilities that the program content of the application program 301 must be corrected. As a result, in order to change the format, the program content need to be corrected by expert engineers, and also, the time duration is required so as to change the program content.

On the other hand, in order to improve a general-purpose characteristic capable of flexibly accepting the change in the formats, such a method has been proposed by which the print data is separated into logical information and layout information in the format printing operation. In the above method, code data indicative of only character strings (in a case of text data) is included in the logical information, and all items such as a font of this character string, a size of this font, modification information, and positional information are included in the layout information. In a processing system for producing a print request, such an information is produced which is constituted by a plurality of logical information, and layout information corresponding to the respective produced information is previously designed as templates.

The method described above is such a printing method that the print data is produced from the above-described two sorts of logical information and the layout information, and then, the produced print data is transmitted to the printing apparatus. In the printing method, since the logical information is separated from the layout information, the change in the templates gives no influence to the logical information. As a consequence, while the application program unit is no longer corrected in order to change the templates, such a printing system capable of readily changing the templates can be realized.

However, in the above-described conventional printing system capable of performing the overlay registering operation on the side of the printing apparatus, there occurs a problem that an overhead is increased when the print data is produced. As a result, in order to maintain the high speed in printing, the conventional printing system requires expensive hardware for producing the print data.

SUMMARY OF THE INVENTION

The present invention has been made to provide a printing control program, a printing control system, and a printing control method, that has a flexible characteristic to a change in formats employed in a stylized business-purpose printing operation, and also, capable of a high speed printing control operation.

In order to achieve the object, according to a first aspect of the invention, there is provided a computer-executable printing control program for causing a printing control system to execute procedures for receiving a print data transmitted from another apparatus and transmitting the print data to a printer, the program including: means for designing layout information including information to discriminate a fixed portion from a variable portion based on a first page of the print data received from the another apparatus; means for transmitting to the printer the print data corresponding to the fixed portion of the first page in accordance with the layout information; and means for transmitting to the printer the print data corresponding to the variable portion of the first page and of subsequent pages in accordance with the layout information.

According to a second aspect of the invention, there is provided a printing control system for receiving a print data transmitted from another apparatus and transmitting the print data to a printer, the system including: a layout information designing unit configured to design layout information including information to discriminate a fixed portion from a variable portion based on a first page of the print data received from the another apparatus; a fixed portion transmitting unit configured to transmit to the printer the print data corresponding to the fixed portion of the first page in accordance with the layout information; and a variable portion transmitting unit configured to transmit to the printer the print data corresponding to the variable portion of the first page and of subsequent pages in accordance with the layout information.

According to a third aspect of the invention, there is provided a printing control method for receiving a print data transmitted from another apparatus and transmitting the print data to a printer, the method including: designing layout information including information to discriminate a fixed portion from a variable portion based on a first page of the print data received from the another apparatus; transmitting to the printer the print data corresponding to the fixed portion of the first page in accordance with the layout information; and transmitting to the printer the print data corresponding to the variable portion of the first page and of subsequent pages in accordance with the layout information.

BRIEF DESCRIPTION OF THE DRAWINGS

The above objects and advantages of the present invention will become more apparent by describing in detail of a preferred embodiment thereof with reference to the accompanying drawings, wherein.

DETAILED DESCRIPTION OF THE PREFERRED EMBODIMENTS

Referring now to the accompanying drawings, a description will be given in detail of a preferred embodiment of a printing control program, a printing control system and a printing control method, according to the present invention.

Figure 1:
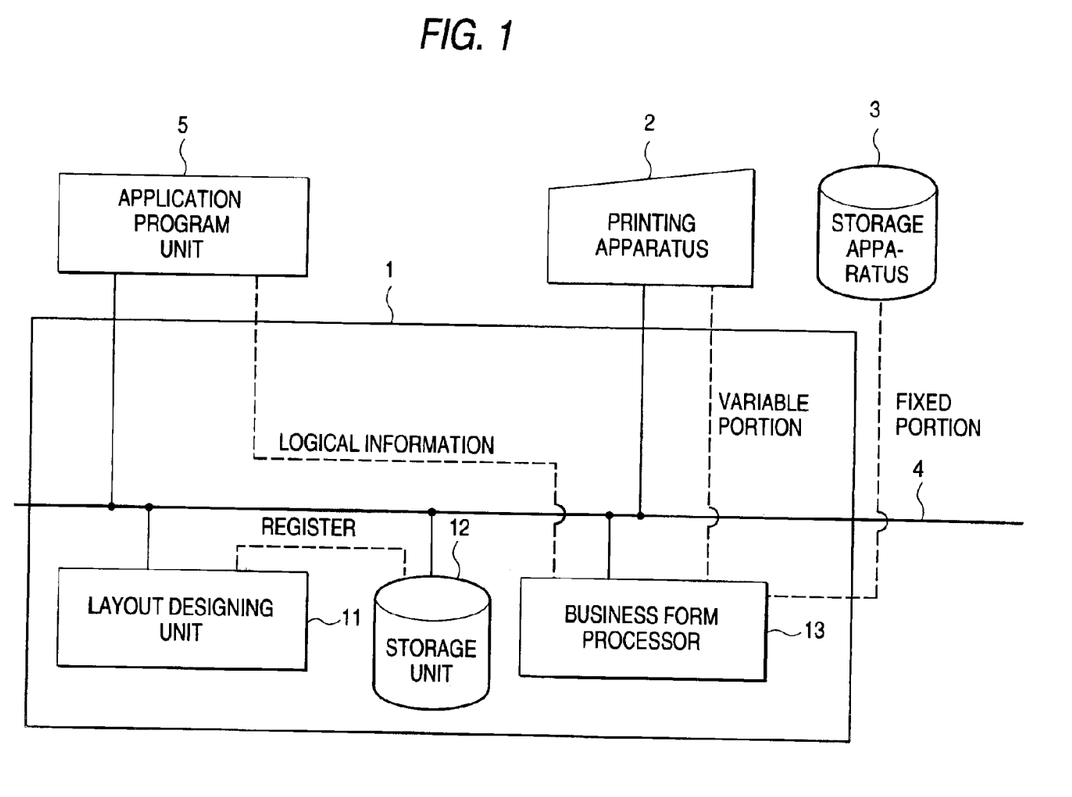
FIG. 1 is a block diagram for indicating a structural example of a printing system according to an embodiment of the present invention.

First, a description is made of an entire arrangement. FIG. 1 is a block diagram showing one structural example of a printing system according to an embodiment of the present invention. As indicated in FIG. 1, the printing system is arranged by connecting a printing control system 1, a printing apparatus (printer) 2 and an application program unit (which corresponds to another apparatus of the invention) 5 via a communication line 4. The above-described storage apparatus 3 is connected to the printing apparatus 2.

The application program unit 5 corresponds to another apparatus which has stored thereinto an application program similar to that of the prior art, while the application program has a function capable of producing logical information used to control printing operations. The application program unit 5 has a function capable of outputting print data to the lower grade printing control system 1.

The printing control system 1 includes a layout designing unit 11, a storage unit 12 and a business form processor 13. It should be noted that this printing system may be alternatively arranged in such a manner that a control signal, an address signal, a data signal, and the like provided in this printing control system 1 may be communicated via an independent bus. Although will be explained later in detail, the layout designing unit 11 has a function capable of designing layouts of printing matters in an initial stage. The storage unit 12 has a function capable of previously storing thereinto layout information designed in the layout designing unit 11.

The business form processor 13 has such a function capable of producing both print data as to a variable portion and print data as to a fixed portion based upon the logical information produced in the application program unit 5 and the layout information designed by the layout designing unit 11. The business form processor 13 further has a function capable of supplying both the print data of the variable portion and the print data of the fixed portion to the printing apparatus 2, respectively. It should also be noted that after the print data of the fixed portion has been outputted from the business form processor 13, this print data is registered as a preliminary registration of a printing operation via the printing apparatus 2 to the storage apparatus 3.

The printing apparatus executes a printing process operation based upon both the print data of the variable potion outputted from the business form processor 13 of the printing control system 1 and the print data of the fixed portion which has been preliminarily registered in the storage apparatus 3. The storage apparatus 3 is connected to the printing apparatus 2, and has a function capable of preliminarily registering thereinto the print data of the fixed portion outputted from the business form processor 13 of the printing control system 1.

Figure 2:
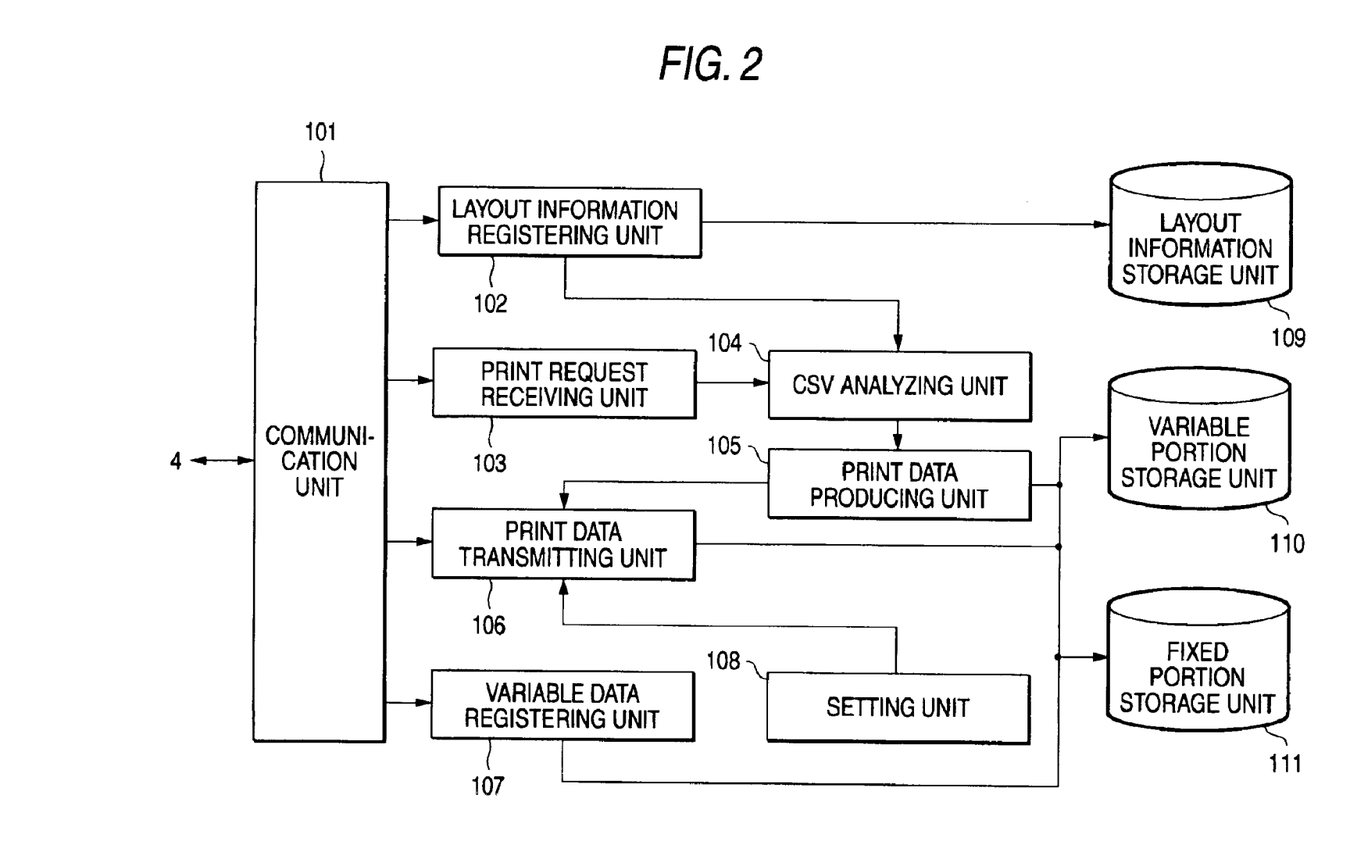
FIG. 2 is a block diagram for explaining a business form processor in a functional manner according to the embodiment.

Subsequently, the business form processor 13 will now be explained in detail with reference to FIG. 2. FIG. 2 is a block diagram for functionally explaining the arrangement of the business form processor 13 according to the embodiment. As shown in FIG. 2, the business form processor 13 includes a communication unit 101, a layout information registering unit 102, a print request receiving unit 103, a CSV (Comma Separated Value) analyzing unit 104, a print data producing unit 105, a print data transmitting unit 106, a variable data registering unit 107, a setting unit 108, a layout information storage unit 109, a variable portion storage unit 110 and a fixed portion storage unit 111.

The communication unit 101 has a function capable of receiving the logical information from the application program unit 5 and the layout information from the storage unit 12 via the communication line 4, and further has a communication interfacing function when both the print data of the fixed portion and the print data of the variable portion are transmitted with respect to the printing apparatus 2.

The layout information registering unit 102 has a function capable of reading the layout information designed by the layout designing unit 11 to temporarily register the read layout information into the layout information storage unit 109. The print request receiving unit 103 has a function capable of receiving a print request (e.g. CSV file) via the communication line 4 from the application program unit 5.

The CSV analyzing unit 104 has a function capable of analyzing a CSV (Comma Separated Value) based upon the CSV file received by the print request receiving unit 103 and the layout information received by the layout information registering unit 102. The print data producing unit 106 has a function capable of sectioning print data to a variable portion and a fixed portion based upon the analysis result of the CSV analyzing unit 104, and of temporarily registering thereinto the print data of the variable portion and the print data of the fixed portion into the variable portion storage unit 110 and the fixed portion storage unit 111, respectively.

The print data transmitting unit 106 has the following function. That is, upon receipt of information for specifying an output destination apparatus of print data from the setting unit 108, the print data transmitting unit 106 reads the print data as to the variable portion and the fixed portion from the variable portion storage unit 110 and the fixed portion storage unit 111, respectively, and then transmits the read print data.

The variable data registering unit 107 has a function capable of temporarily storing thereinto print data as to 2 pages and succeeding pages, namely print data as to only a variable portion, into the variable portion storage unit 110. The setting unit 108 has the following function. That is, while the setting unit 108 previously sets information for specifying an output destination apparatus, the setting unit 108 supplies the information for specifying the output destination apparatus with respect to the print data transmitting unit 106 during printing operation. The information for specifying the output destination apparatus is such information designated from the application program unit 6.

Figure 3:
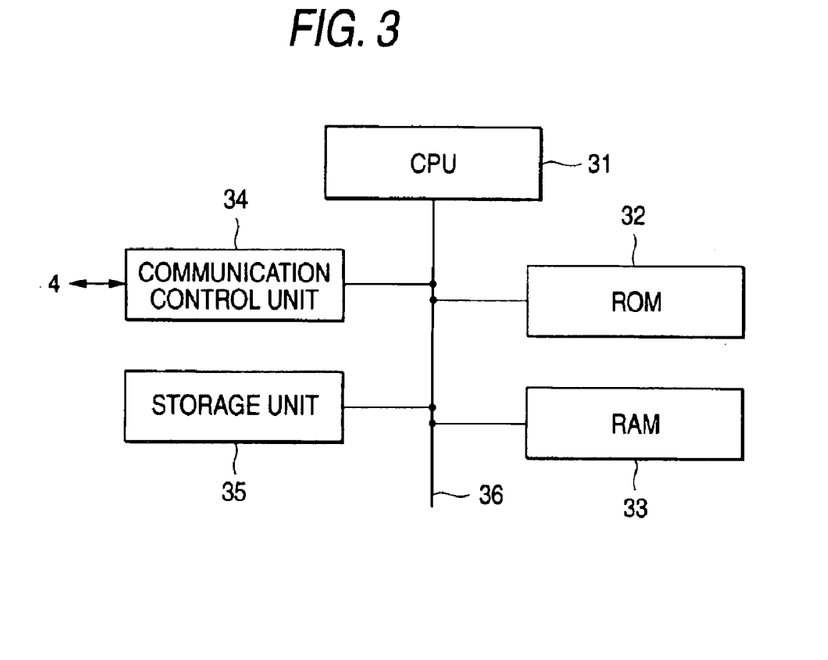
FIG. 3 is a block diagram for indicating a structural example of the business form processor according to the embodiment.

Next, the business form processor 13 will now be explained with reference to FIG. 3. FIG. 3 is a block diagram for indicating one structural example of the business form processor 13 according to the embodiment. As indicated in FIG. 3, the business form processor 13 includes a CPU 31, a ROM 32, a RAM 33, a communication control unit 34, and a storage unit 35, each being connected to each other via a bus 36. The CPU 31 has a function capable of controlling an entire unit of the business form processor 13 in accordance with a program stored in the ROM 32.

The ROM 32 stores thereinto the program for controlling the entire unit of the business form processor 13, and has a function capable of supplying the program in order that the CPU 31 is operated. The functions which can be executed by the program in the ROM 32 includes the functional blocks as exemplary shown in FIG. 2. The RAM 33 may function as a work area when the CPU 31 executes the program.

The communication control unit 34 has a function capable of establishing a communication between the internal unit and an external apparatus via the communication line 4. The storage unit 35 corresponds to the layout information storage unit 109, the variable portion storage unit 110, and the fixed portion storage unit 111 shown in FIG. 2.

Figure 4:
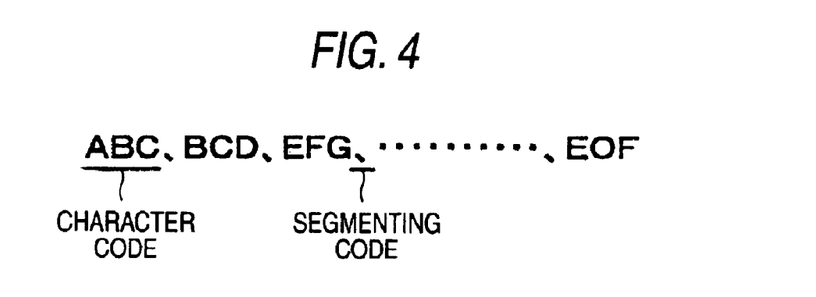
FIG. 4 is a diagram for explaining a format of a CSV file.
Figure 5:
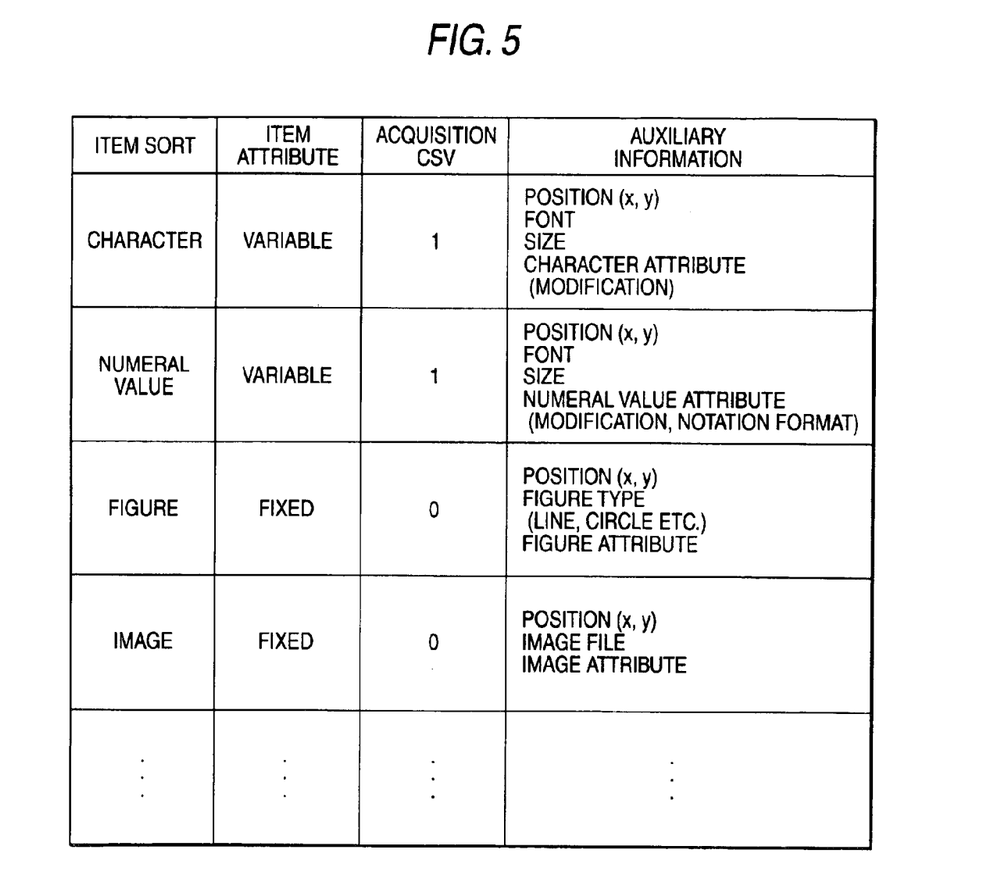
FIG. 5 is a diagram for explaining a file format of layout information according to the embodiment.

Hereinafter, both CSV and layout information will be explained. FIG. 4 is a diagram for explaining a format of a CSV file. FIG. 5 is a diagram for explaining a file format of layout information according to the embodiment.

As indicated in FIG. 4, the CSV is equipped with such a format that character codes (corresponding to character string) are arranged while these character codes are segmented by using segmenting codes (for example, commas) as delimiters, and an end of a file is expressed by an EOF (End of File) code.

As shown in FIG. 5, in the file format of the layout information, there are a character, a numeral value, a figure, an image, and the like as item sorts. Attributes of these character, numeral value, figure, and image are variable, variable, fixed, and fixed, respectively. In other words, such items for constituting print data of a variable portion correspond to, for example, the character item and the numeral value item, whereas such items for constituting print data of a fixed portion correspond to the figure item and the image item. An acquisition CSV indicates a total number of each of the item sorts, and implies "1" when the acquisition CSV is "1", and implies "0" when the acquisition CSV is "0."

As auxiliary information of the variable portion, in the case of the item of the character, there includes information such as a position (x, y), a font, a size, and a character attribute (modification), whereas in the case of the item of the numeral value, there includes information such as a position (x, y), a font, a size, and a numeral value attribute (modification, notation format).

As auxiliary information of the fixed portion, in the case of the item of the figure, there includes information such as a position (x, y), a figure type, and a figure attribute, whereas in the case of the item of the image, there includes information such as a position (x, y), an image file, and an image attribute.

With respect to the above-explained layout information, the business form processor 13 discriminates whether print data corresponds to print data of a variable portion, or print data of a fixed portion based on the item attribute for indicating whether the item corresponds to the variable attribute or the fixed attribute.

Figure 6:
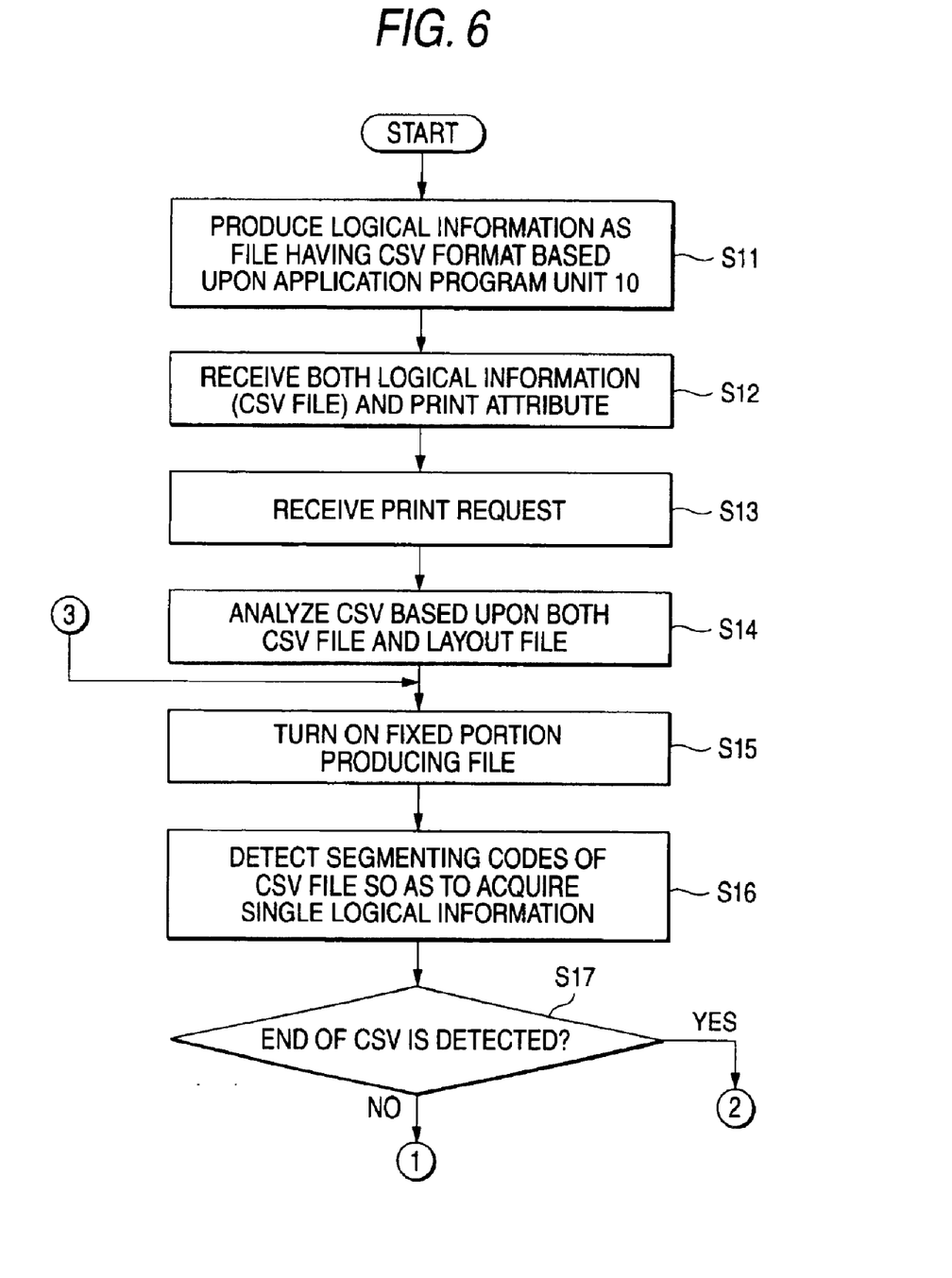
FIG. 6 is a flow chart for describing a major control operation of a printing system according to the embodiment.
Figure 7:
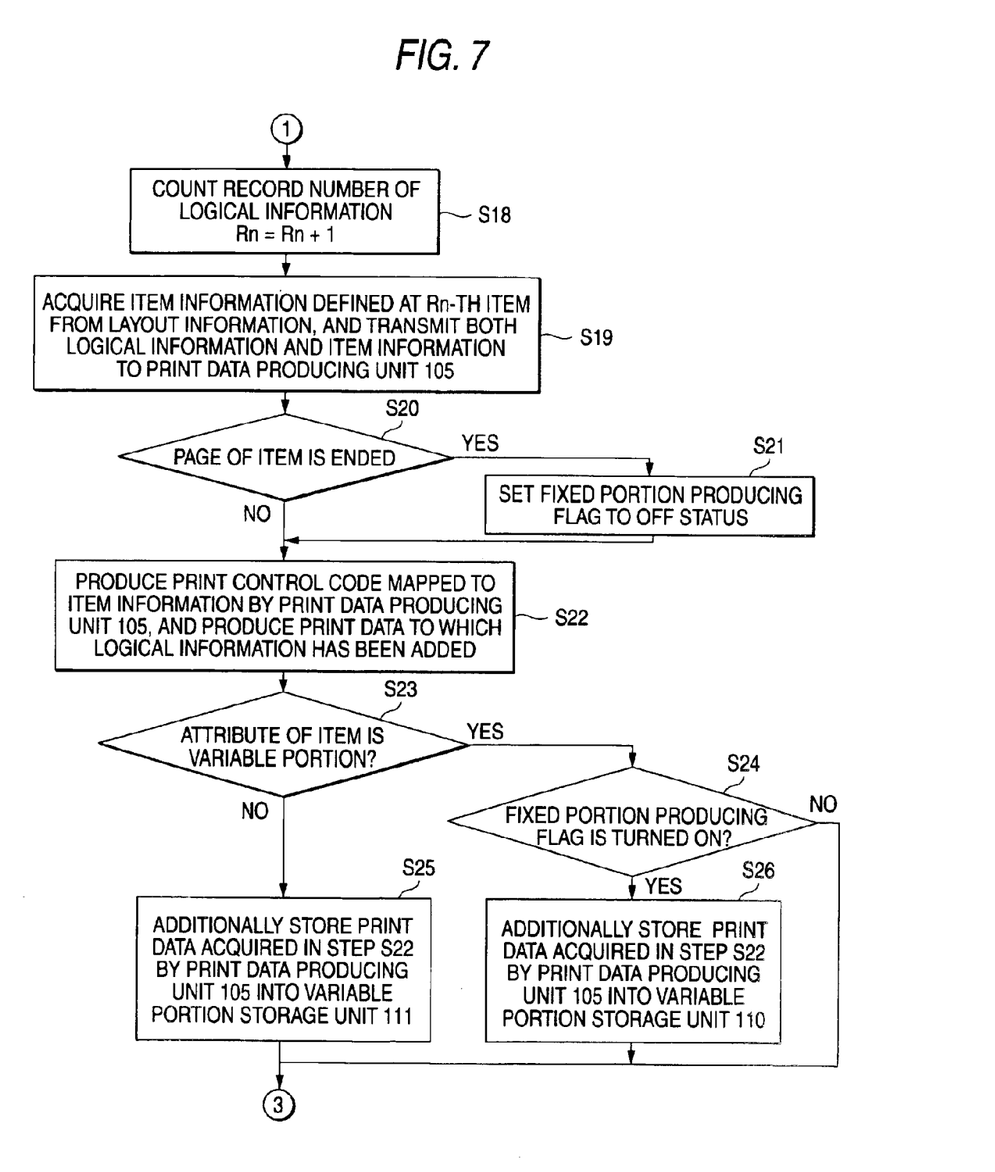
FIG. 7 is another flow chart for describing the major control operation of the printing system according to the embodiment.
Figure 8:
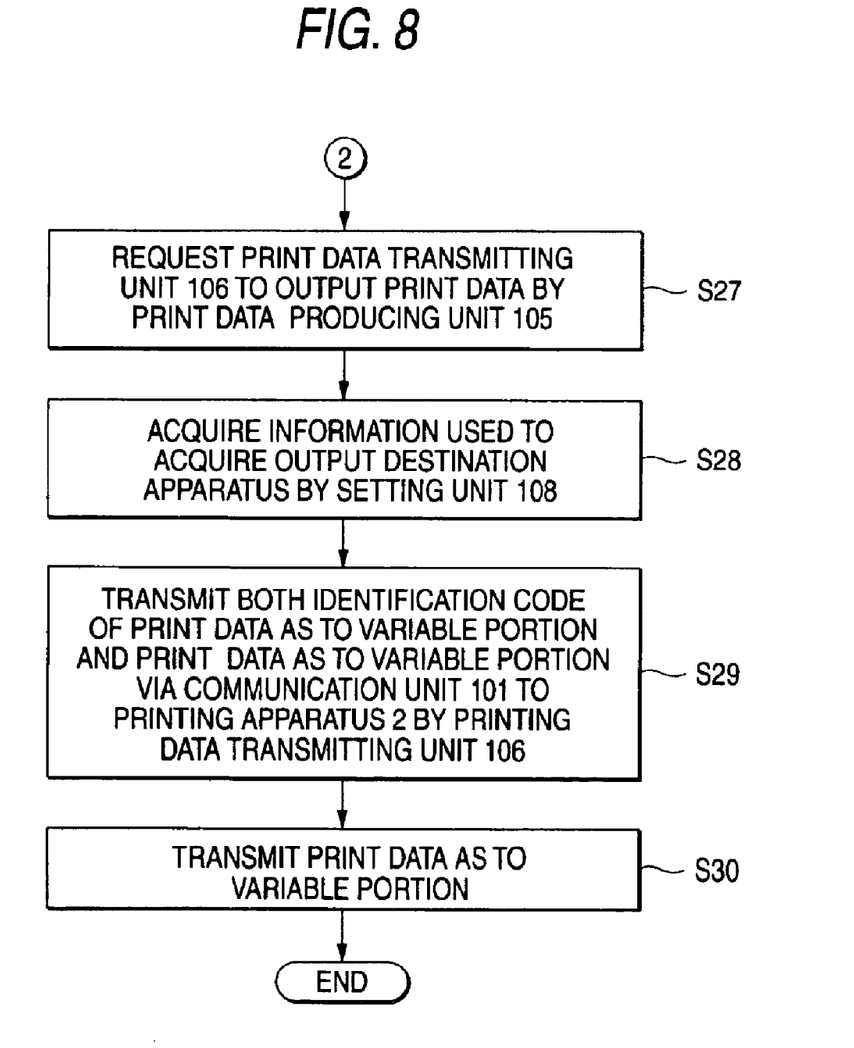
FIG. 8 is another flow chart for describing the major control operation of the printing system according to the embodiment.
Figure 9:
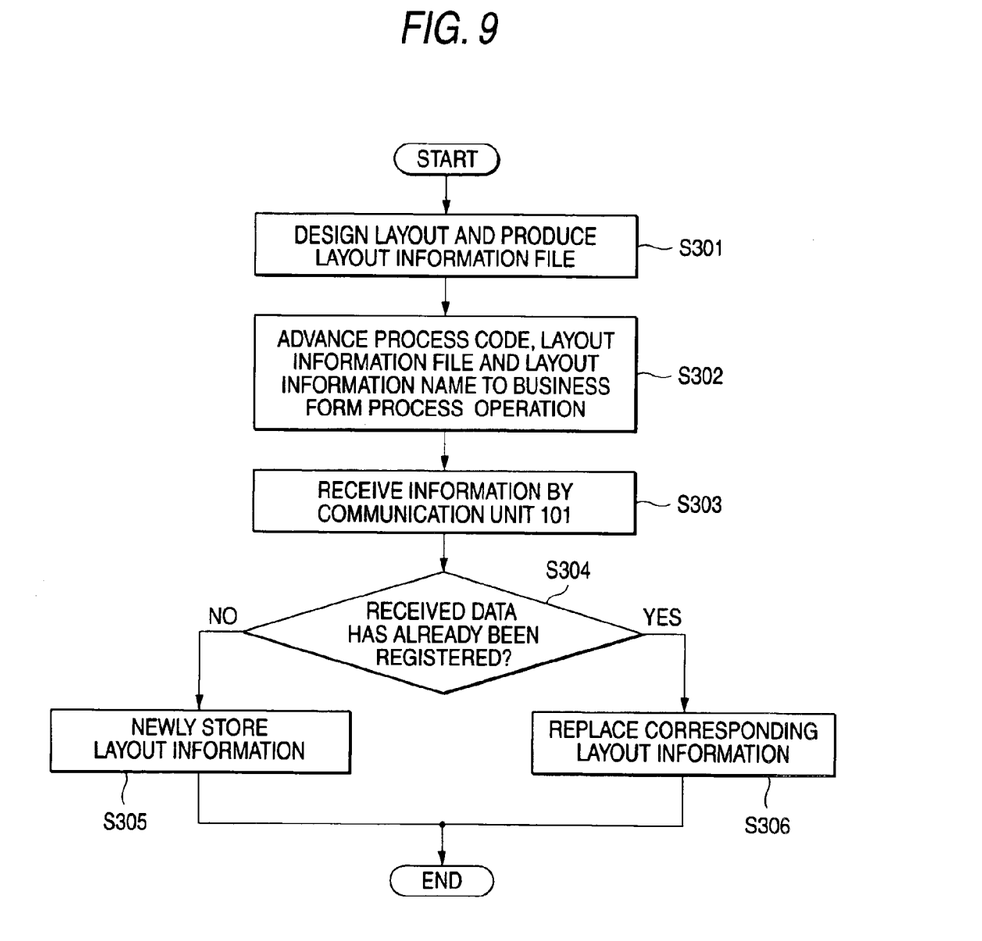
FIG. 9 is a flow chart for explaining a registering sequential operation of layout information according to the embodiment.

Next, operations of the printing system according to the embodiment will now be described. FIGS. 6 through 8 are flow charts for explaining a major control operation of the printing system according to the embodiment. FIG. 9 is a flow chart for describing a registering sequential operation of layout information according to the embodiment.

Hereinafter, a description is made of the major control operation of the printing system with reference to FIGS. 6 through 8. First, the application program unit 10 executes a process operation so as to produce a CSV-formatted file (namely, CSV file) as to logical information required in a printing operation (step S11). In other words, in the step S11, such a file is produced which is constituted by a series of data stream in which a plurality of logic information is segmented by segmenting codes such as commas.

The application program unit 10 executes a process operation so as to transmit information, a CSV file, and a print attribute to the business form processor 13 (step S12). This information is to specify an output destination apparatus designated by another apparatus (not shown). The CSV file is produced in the step S11. The print attribute contains a file name of layout information which is required in a stylized printing operation. At this time, in the business form processor 13, a receiving operation is carried out in the communication unit 101.

Then, in the case that a process code corresponds to a code indicative of a stylized printing operation, a print request is received by the print request receiving unit 103. In other words, since the CSV file is received from the application program unit 6, this received CSV file is outputted to the CSV analyzing unit 104. At this time, the layout information (see FIG. 5) is outputted from the layout information registering unit 102 with respect to the CSV analyzing unit 104. Thus, the CSV analyzing unit 104 executes the CSV analyzing operation in this manner (step S13).

Since the printing operation corresponds to a first page of a printing matter at this stage, a fixed portion producing flag is turned ON (step S15). Then, as a result of analysis made by the CSV analyzing unit 104, a segmenting code is detected, and first logical information is acquired (step S16). Since the CSV file is ended at the EOF code, the process operation is advanced to a step S18 until the EOF code of the CSV file is detected ("NO" in step S17). On the other hand, when the EOF is detected ("YES" in step S17), the process operation is advanced to a step S27.

In step S18, a record number of the logical information is counted. Assuming now that the record number is "Rn" (symbol "n" being natural number), a formula is defined by Rn=Rn+1. Then, information of an item which is defined at an Rn-th item is acquired from the layout information, and then, both the logic information and the information of the acquired item are outputted to the print data producing unit 105 (step S19).

Then, a determination is made by the CPU 31 as to whether or not a page of the item is ended based upon the information of the item (step S20). If the CPU 31 so determines that the page of the item is ended ("YES" in step S20), then the fixed portion producing flag is turned OFF (step S21), and then, the process operation is advanced to a step S22. On the other hand, when such a determination is made by the CPU 31 that the page of the item is not yet ended ("NO" in step S20), the process operation is advanced to the step S22.

In step S22, the print data producing unit 105 executes a process operation by which a print control code mapped to the information of the item is produced, and the logical information is added to this produced print control code so as to produce print data. Then, the CPU 31 determines as to whether or not an item attribute corresponds to a variable portion (step S23).

When the CPU 31 determines that the item attribute corresponds to the variable portion ("YES" in step S23), the CPU 31 determines as to whether or not the fixed portion producing flag is turned ON (step S24). As a result of the determination, when the fixed portion producing flag is turned ON ("YES" in step S24), the print data producing unit 105 executes such a process operation that the print data produced in the step S22 is additionally stored in the variable portion storage unit 110 (step S26). Then the process operation is returned to the step S16.

In the step S23, when the CPU 31 determines that the item attribute corresponds to the fixed portion ("NO" in step S23), the print data producing unit 105 execute such a process operation that the print data produced in the step S22 is additionally stored into the fixed portion storage unit 111 (step S25). Then, the process operation is returned to the step S16.

When the CPU 31 determines that the item attribute corresponds to the variable portion ("YES" in step S23) and the fixed portion producing flag is turned OFF ("NO" in step S24), the process operation is directly returned to the step S16.

On the other hand, in the above-described step S17, when the end of the CSV is detected ("YES" in step S17), the print data producing unit 105 issues an output request to the print data transmitting unit 106 in a step S27. Then, the setting unit 108 acquires such information for specifying an output destination apparatus (step S28). As the information for specifying the output destination apparatus, information such as a network address and the like, which are required in a communication every output destination, corresponds thereto.

The print data transmitting unit 106 transmits both information for identifying the print data of the variable portion and the print information of the variable portion to the communication unit 101, and furthermore transmits these information and print data to the printing apparatus 2 which constitutes an output destination based on the information for specifying the output destination apparatus (step S29). Then, the print data transmitting unit 106 reads the print data from the variable portion storage unit 111, and transmits the read print data to the printing apparatus 2 (step S30).

When a request of the print data of the fixed portion issued from the printing apparatus 2 in an asynchronous manner is received, a control operation is performed for transmitting the corresponding print data of the fixed portion in the variable data registering unit 107. A control operation is achieved in such that the fixed portion is diverted among the jobs by a configuration where the printing apparatus 2 holds the print data of the fixed portion which has been once registered in the storage apparatus 3.

Subsequently, a registering sequential operation of layout information will now be explained with reference to FIG. 9. The registering operation of the layout information is carried out in advance before a printing operation is carried out, and acquires a file as shown in FIG. 5. First, the layout designing unit 11 executes such a process operation for designing a layout and for producing a file of layout information (layout information file) in a step S301.

Then, a process code, the layout information file, a title of the layout information are transmitted to the business form processor 13 (step S302). The business form processor 13 receives the process code, the layout information file, and the title of the layout information (step S303).

Then, in a case that the received data has not yet been registered ("NO" in step S304), the layout information is newly registered (step S305). On the other hand, in a case that the received data has been registered ("YES" in step S304), such a process operation is carried out in which the relevant layout information is replaced (step S306).

As previously described, in the printing control system 1 according to the embodiment, in the process operation for the first page of the printing matter, the variable portion of the print data is separated from the fixed portion of the print data based upon the logical information and the layout information capable of discriminating the fixed portion from the variable portion, which are produced by the application program unit 5, and thus, the print data of the fixed portion can be registered into the storage apparatus 3 provided on the side of the printing apparatus 2 in the preliminary manner. As a consequence, since both the process operation for the second page of the printing matter, and the process operation for the fixed portion having the same format which has been once print-processed are not repeatedly carried out, the processing time required for producing the print data can be reduced. Furthermore, only the changed information (changed format) as to the fixed portion of the print data can be properly transmitted to the printing apparatus 2. After the format has been changed, only the variable portion of the print matter is merely transmitted, so that both the data transfer time with respect to the printing apparatus 2 and the printing process time can be shortened.

As a result, in the stylized printing works, while the printing performance such as the high speed printing operation can be satisfied, since the printing format has the flexibility, the printing format can be quickly changed. Also, since the hardware system for constructing the printing system can be arranged in low cost, the entire system can be made inexpensive.

As previously explained, according to the present invention, the information used to discriminate the fixed portion from the variable portion is acquired based on the print data of the first page, and the print data as to the variable portion is transmitted to the printing apparatus, and thereafter, the print data from the print data as to the variable portion of the first page is transmitted to the printing apparatus. As a result, there is such an advantage that with employment of the inexpensive structure, the printing control program can be obtained by which the flexibility for changing the formats in the stylized business printing operation can be achieved, and also the high speed printing control operation can be maintained.

According to the present invention, the information used to discriminate the fixed portion from the variable portion is acquired based on the print data of the first page, and the print data as to the variable portion is transmitted to the printing apparatus, and thereafter, the print data from the print data as to the variable portion of the first page is transmitted to the printing apparatus. As a result, there is such an advantage that with employment of the inexpensive structure, the printing control system can be obtained by which the flexibility for changing the formats in the stylized business printing operation can be achieved, and also the high speed printing control operation can be maintained.

According to the present invention, the information used to discriminate the fixed portion from the variable portion is acquired based upon the print data of the first page, and the print data as to the variable portion is transmitted to the printing apparatus, and thereafter, the print data from the print data as to the variable portion of the first page is transmitted to the printing apparatus. As a result, there is such an advantage that with employment of the inexpensive structure, the printing control method can be obtained by which the flexibility for changing the formats in the stylized business printing operation can be achieved, and also the high speed printing control operation can be maintained.

A printing control program according to a first aspect of the invention, is such a computer-executable printing control program (corresponding to flow charts shown in FIGS. 6 through 9) of a printing control system for transmitting print data received from another apparatus (corresponding to application program unit 5 of FIG. 1) with respect to a printing apparatus (corresponding to printing apparatus 2 of FIG. 1) capable of registering thereinto print data of a fixed portion so as to control a printing operation, including: a first step for designing layout information containing information used to discriminate the fixed portion of the print data from a variable portion of the print data based on a first page of the print data received from the another apparatus; a second step for transmitting the print data as to the fixed portion within the first page of the print data received from the another apparatus to the printing apparatus based on the information used to discriminate the fixed portion of the print data from the variable portion thereof contained in the layout information designed in the first step; and a third step for transmitting print data as to a variable portion to the printing apparatus based upon the information used to discriminate the fixed portion from the variable portion contained in the layout information which is designed in the first designing step with respect to the print data containing the first page and pages subsequent to the first page, which is received from the another apparatus after the print data as to the fixed portion has been transmitted in the second step.

According to the first aspect of the invention, the information used to discriminate the fixed portion from the variable portion is acquired based on the print data of the first page, and the print data as to the variable portion is transmitted to the printing apparatus, and thereafter, the print data from the print data as to the variable portion of the first page is transmitted to the printing apparatus. As a result, the software structures provided on the side of the printing apparatus can be properly arranged in response to the change in the fixed portions, and the expensive hardware structures are no longer required. As a consequence, with employment of the inexpensive structure, the flexibility for changing the formats in the stylized business printing operation can be achieved, and also the high speed printing control operation can be maintained.

According to a second aspect of the invention, there is provided a printing control system (corresponding to printing control system 1 of FIG. 1) for transmitting print data received from another apparatus (corresponding to application program unit 5 of FIG. 1) with respect to a printing apparatus (corresponding to printing apparatus 2 of FIG. 1) capable of registering thereinto print data of a fixed portion so as to control a printing operation, comprising: designing unit (corresponding to layout designing unit 11 of FIG. 1) for designing layout information containing information used to discriminate the fixed portion of the print data from a variable portion of the print data based upon a first page of the print data received from the another apparatus; registered portion transmitting unit (corresponding to business form processor 13 of FIG. 1) for transmitting the print data as to the fixed portion within the first page of the print data received from the another apparatus to the printing apparatus based upon the information used to discriminate the fixed portion of the print data from the variable portion thereof contained in the layout information designed in the designing unit; and variable portion transmitting unit (corresponding to business form processor 13 of FIG. 1) for transmitting print data as to a variable portion to the printing apparatus based upon the information used to discriminate the fixed portion from the variable portion contained in the layout information which is designed in the designing unit with respect to the print data containing the first page and pages subsequent to the first page, which is received from the another apparatus after the print data as to the fixed portion has been transmitted by the registered portion transmitting unit.

According to the second aspect of the invention, the information used to discriminate the fixed portion from the variable portion is acquired based upon the print data of the first page, and the print data as to the variable portion is transmitted to the printing apparatus, and thereafter, the print data from the print data as to the variable portion of the first page is transmitted to the printing apparatus. As a result, the software structures provided on the side of the printing apparatus can be properly arranged in response to the change in the fixed portions, and the expensive hardware structures are no longer required. As a consequence, with employment of the inexpensive structure, the flexibility for changing the formats in the stylized business printing operation can be achieved, and also the high speed printing control operation can be maintained.

According to a third aspect of the invention, there is provided a printing control method (corresponding to flow charts of FIGS. 6 through 9) for transmitting print data received from another apparatus (corresponding to application program unit 5 of FIG. 1) with respect to a printing apparatus (corresponding to printing apparatus 2 of FIG. 1) capable of registering thereinto print data of a fixed portion so as to control a printing operation, including: a first step for designing layout information containing information used to discriminate the fixed portion of the print data from a variable portion of the print data based upon a first page of the print data received from the another apparatus; a second step for transmitting the print data as to the fixed portion within the first page of the print data received from the another apparatus to the printing apparatus based on the information used to discriminate the fixed portion of the print data from the variable portion thereof contained in the layout information designed in the first step; and a third step for transmitting print data as to a variable portion to the printing apparatus based upon the information used to discriminate the fixed portion from the variable portion contained in the layout information which is designed in the first designing step with respect to the print data containing the first page and pages subsequent to the first page, which is received from the another apparatus after the print data as to the fixed portion has been transmitted in the second step.

According to the third aspect of the invention, the information used to discriminate the fixed portion from the variable portion is acquired based upon the print data of the first page, and the print data as to the variable portion is transmitted to the printing apparatus, and thereafter, the print data from the print data as to the variable portion of the first page is transmitted to the printing apparatus. As a result, the software structures provided on the side of the printing apparatus can be properly arranged in response to the change in the fixed portions, and the expensive hardware structures are no longer required. As a consequence, with employment of the inexpensive structure, the flexibility for changing the formats in the stylized business printing operation can be achieved, and also the high speed printing control operation can be maintained.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A computer-executable printing control program for causing a printing control system to execute procedures for receiving a print data transmitted from another apparatus and transmitting the print data to a printer, the program comprising:

means for designing layout information including information to discriminate a fixed portion from a variable portion based on a first page of the print data received from the another apparatus;

means for transmitting to the printer the print data corresponding to the fixed portion of the first page in accordance with the layout information; and means for transmitting to the printer the print data corresponding to the variable portion of the first page and of subsequent pages in accordance with the layout information.

2. The printing control program as claimed in claim 1, wherein the means for transmitting the variable portion is further configured to separate the print data into the fixed portion and the variable portion based on the layout information, and to transmit the print data corresponding to the variable portion to the printer in units of page.

3. A printing control system for receiving a print data transmitted from another apparatus and transmitting the print data to a printer, the system comprising:

a layout information designing unit configured to design layout information including information to discriminate a fixed portion from a variable portion based on a first page of the print data received from the another apparatus;

a fixed portion transmitting unit configured to transmit to the printer the print data corresponding to the fixed portion of the first page in accordance with the layout information; and a variable portion transmitting unit configured to transmit to the printer the print data corresponding to the variable portion of the first page and of subsequent pages in accordance with the layout information.

4. The printing control system as claimed in claim 3, wherein the variable portion transmitting unit is further configured to separate the print data into the fixed portion and the variable portion based on the layout information, and to transmit the print data corresponding to the variable portion to the printer in units of page.

5. A printing control method for receiving a print data transmitted from another apparatus and transmitting the print data to a printer, the method comprising:

designing layout information including information to discriminate a fixed portion from a variable portion based on a first page of the print data received from the another apparatus;

transmitting to the printer the print data corresponding to the fixed portion of the first page in accordance with the layout information; and transmitting to the printer the print data corresponding to the variable portion of the first page and of subsequent pages in accordance with the layout information.

6. The printing control method as claimed in claim 5, wherein the transmitting of the variable portion further comprises:

separating the print data into the fixed portion and the variable portion based on the layout information; and transmitting the print data corresponding to the variable portion to the printer in units of page.

* * * * *